Herrington & Richards,
Scaffold.
No. 90,842. Patented June 1, 1869.
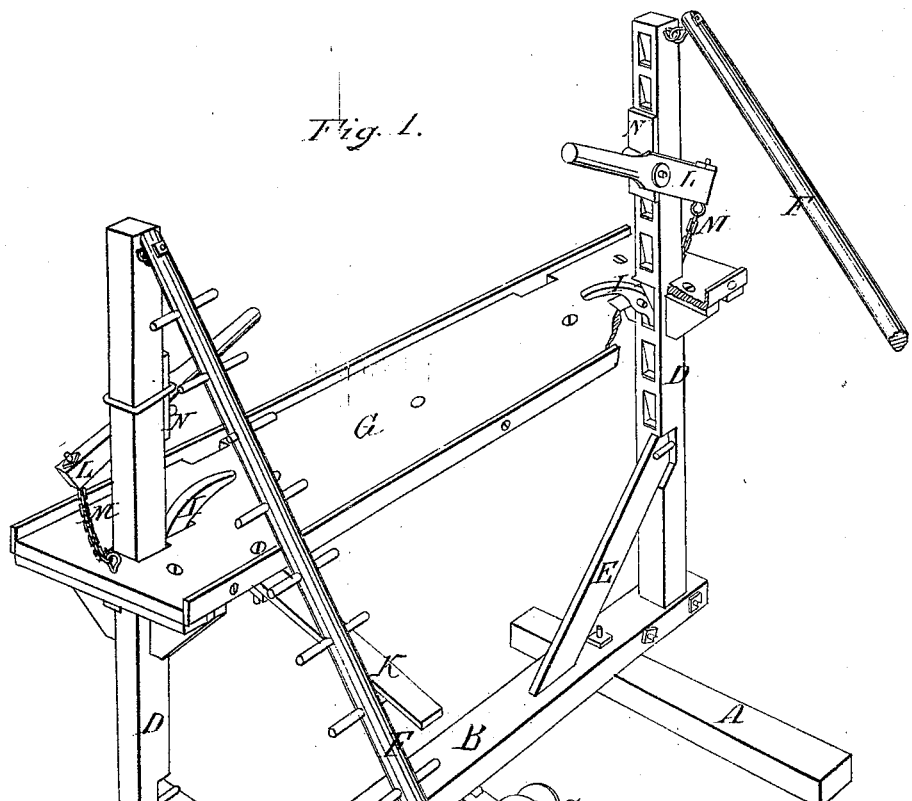
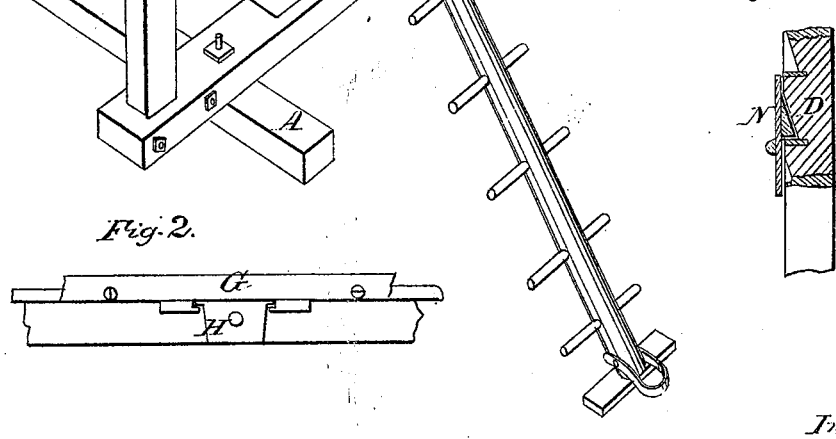
Witnesses.
Harry King.
Leopold Quent
Inventors.
A. E. Herrington
L. D. Richards
per Alexander & Mason
Attys.
N. PETERS, PHOTO-LITHOGRAPHER, WASHINGTON, D. C.

United States Patent Office.

ALBERT E. HERRINGTON AND JOHN D. RICHARDS, OF SCHOOLCRAFT, MICHIGAN.

Letters Patent No. 90,842, dated June 1, 1869.

IMPROVED PORTABLE SCAFFOLD.

The Schedule referred to in these Letters Patent and making part of the same.

*To all whom it may concern:*

Be it known that we, ALBERT E. HERRINGTON and JOHN D. RICHARDS, of Schoolcraft, in the county of Kalamazoo, and in the State of Michigan, have invented new and useful Improvements in Portable Elevating-Scaffolds; and do hereby declare that the following is a full, clear, and exact description thereof, reference being had to the accompanying drawings, and to the letters of reference marked thereon.

The object of our invention is to provide a simple and easily-managed portable scaffold for builders, masons, and for gathering fruit, and other such purposes.

Figure 1 is a perspective of our scaffold.

Figure 2 is a side view of a portion of the table.

Figure 3 is a side view of a part of one of the posts.

Letter A represents the ground-sills, upon which the scaffold rests, and which have several holes made through them, so that the main beam can be shifted from one position to another, so as to suit the inequalities of the earth.

Bolted to the tops of these sills is the beam B, upon which the whole scaffold rests.

Hinged to the middle of this beam there is a small wheel, C, which assists in shifting the machine from one place to another.

In order to bring this wheel into play, one end of the scaffold should be raised, so as to allow it to run under the beam, when it can be made to carry the whole apparatus in any direction.

Each end of this beam has a mortise cut in it, in which the posts D are placed, and, to give them additional strength, are supported by the braces E.

Upon the inner sides of these posts there are a number of ratchets cut; and, in order to prevent them from being worn, there is a metal plate or bar placed at the bottom, as seen in fig. 3.

Hinged to the tops of these posts there are the ladders F, up which the men climb to the table. The lower ends are secured to small ground-sills, so as to prevent them from being turned over while the workmen are upon them.

They are also provided with staples, or hooks, through which stakes are driven, so as to keep them in their places.

In placing the rounds through these ladders, care should be taken to have them only at such heights as to correspond with the ratchets in the posts.

Extending from post to post is the table G, upon which the men work, and which has a raised edge along its sides, so as to prevent the tools from falling off, and which has several mortises cut along the edges, into which the hand-saws are hung, so as to prevent them from being trod upon.

In order to prevent this board from giving, or bending when weights are placed upon it, a brace or board is placed underneath, as seen in fig. 2, so as to strengthen it, and, for the convenience of keeping tools, paints, brushes, &c., a drawer, H, has also been provided.

Upon each side of the posts D there have been triangular pieces placed, which serve not only to brace the table, but also prevent it from tipping.

Pivoted at each end, in a slot made for this purpose, are the dogs I, by which the table is supported.

The lower ends of these dogs I are heavier than the upper ones, so as to make them catch in the ratchets without the use of a spring.

Fastened to the lower side of this table is a board, in such a manner that it can swing freely around, and is intended to extend out so as to rest upon the rounds of the ladders F, so that the workmen can walk upon it.

Passing through each end of this table there is a small staple, to which are attached the hand-levers L, by means of short chains.

Secured to the sides of these levers are the catches N, by which the table is raised.

These catches are flat metal plates, which have projections or shoulders on their backs, of the same shape as the ratchets, and are hinged to the levers by means of bolts passing through.

In order to hold these plates against the posts, a cord, brace, or any suitable thing, may be used, which, when it is desired to lower or raise the plate to another ratchet, can be readily slipped off.

Both of these levers are placed so as to be worked from the right, and, when there are two men upon the table at once, both can be worked at once.

When, however, there is only one, by working them alternately the table can be raised just as well.

As soon as the table has been raised to the catches, they are removed, and placed up in the ratchets above, but in descending they are brought down to a level with the table.

Having thus described our invention,

What we claim, and desire to secure by Letters Patent, is—

The arrangement of the posts D, levers L, ladders F, sills A and B, wheel C, catches N, dogs I, and chains M, when all are combined, in the manner and for the purpose described.

In testimony that we claim the foregoing, we have hereunto set our hand, this 25th day of March, 1869.

A. E. HERRINGTON.
    J. D. RICHARDS.

Witnesses:
 H. I. SMITH,
 HENRY I. ALLEN.